Figure 1:
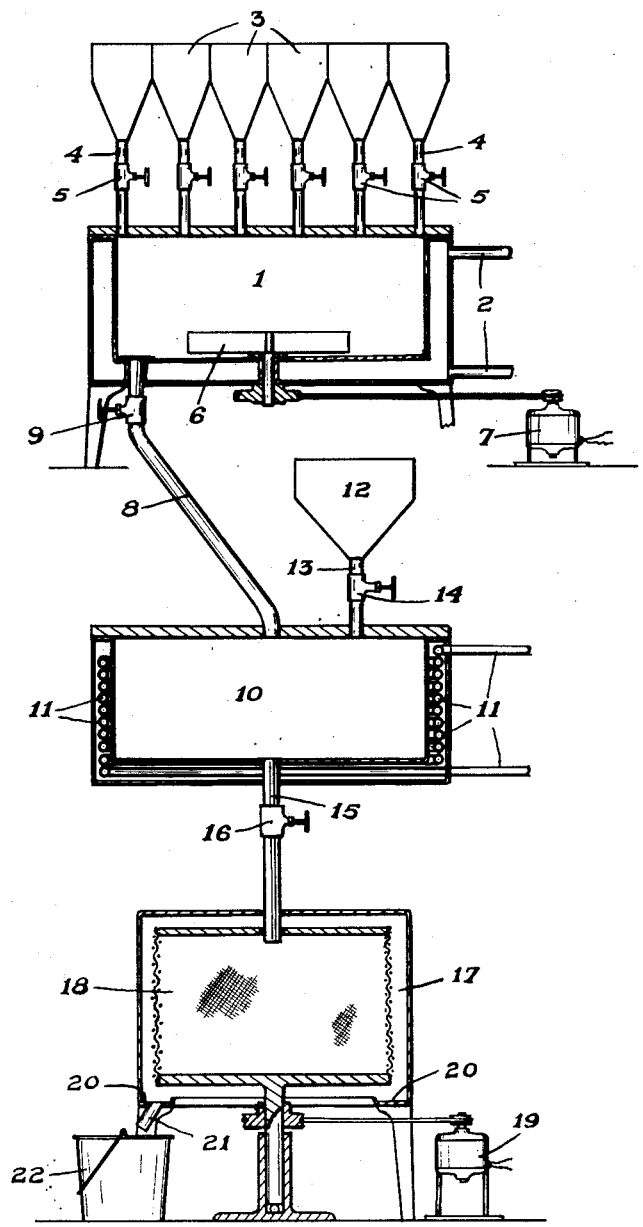

June 22, 1937. I. H. HALL 2,084,640
PROCESS OF PREPARING CUSTARD FILLING
Filed June 21, 1935

Inventor
I. H. Hall
By William C. Linton
Atty.

Patented June 22, 1937

2,084,640

UNITED STATES PATENT OFFICE 2,084,640

PROCESS OF PREPARING CUSTARD FILLING

Iphus Harvey Hall, Winnipeg, Manitoba, Canada

Application June 21, 1935, Serial No. 27,809

4 Claims. (Cl. 99—139)

Before describing the ingredients and process of building up the compound, a general description of the defects found in custards, the difficulties encountered in their making, and an analysis of the causes leading up and relating thereto is in order, that a better understanding of the advantages to be derived from the use of the compound will be secured.

The baker is very often puzzled by characteristics or phenomena which presents themselves in a finished custard. Splendid results may be attained over a long period, and then suddenly, they will develope peculiar properties which are extremely annoying both from a satisfactory baking standpoint and the fact that the delicatessen becomes almost, if not wholly, unsaleable.

Cracking of the custard ceiling or deep seams scarring across the face thereof is one of the most common annoyances. Sometimes the finished custard has a spongy texture indicating a separation of the colloidal structure into little pockets or cells. Apparently these cells are brought about by liquid which has collected in air pockets where they have been turned into vapor by the heat and then built up a tension on the surrounding walls.

A third condition which very often arises in conjunction with the first is the so-called watering of custard, sometimes called weeping or wheying off. Water begins to appear close to the crust and fine crevices begin to form which are usually filled with water. Sometimes this weeping and separation in combination with the spongy texture of the custard structure produces a soaking of the crust and the wet appearance and soggy taste renders it edibly undesirable as a dessert. In many cases the custard shrinks after cooling leaving enlarged pores or tunnels above the crust giving a wasted away appearance while the crust has a cheesy taste. With this type of custard, molds quickly develope necessitating early consumption to avoid loss.

Then there is the development of a heavy starchy layer which lies next to the crust and over which a very fine but delicate custard structure is formed. This too, often makes its appearance without any warning, and as often disappears as unaccountable as it came.

Another source of annoyance is custard discoloration. Custard, as every baker knows, should have a very attractive yellow color due to the eggs used in its manufacture. This color sometimes takes on a greenish caste while the flavor is invariably bitter.

The above undesirable qualities in finished custards are the result of (1st), the amount of sugar employed, (2nd), too much agitation in the stirring of the milk, eggs and other ingredients at the time of preparation, (3rd), improper length of time or temperature in cooking, (4th), it may be caused by organisms which have become engendered in the custard filling directly after baking, or (5th), using corn starch as a thickening agent.

A change in the quantity of sugar used brings about a change in the specific gravity of the prepared filling or in other words, as the amount of sugar is decreased in the filling, the density of the solution becomes lower. The result is that a lower temperature will boil the filling. At a given cooking temperature with insufficient sugar, the filling would become cooked or set before the upper surface becomes caramelized and a continuation of the heat to color the surface will cause the filling to boil and destroy the structure of the custard due to the emitting vapor.

From the above, it will be apparent that the ideal quantity of sugar would be; when a given temperature will cook or set the filling at the same time the upper surface becomes caramelized. The exactitude of the amount can be appreciated.

Sugar also plays an important part in the amount of sweetness of the finished custard and the texture of the filling. The more sugar, the smoother and softer the texture. An extreme shortage of sugar will produce a cheesy taste which quickly forms molds.

With the above information, the troubles of the baker can be appreciated when it is noted that he must provide a filling which will set at the same time that the upper surface caramelizes, secure the proper amount of sweetness and the right texture when all four are controlled by the amount of sugar with a slight variation in the temperature and length of time in the cooking.

Due to the heavy viscosity of the liquid, forming the filling, too much agitation in the preparation thereof causes air bubbles to be formed or whipped therein. The quantity of air that it will retain depends upon the physical properties of the filling. As the custard remains in the oven, it absorbs heat, causing its temperature to go up. It finally reaches a point where the filling becomes a gel. When this state is reached, the viscous character of the filling will resist the tension produced by the vapor, which forms during baking, and the result will be a spongy structure. If the custard is permitted to remain in the oven after it has set, or after the gel has been formed, it finally reaches a temperature at which vapor is generated within its structure. The vapor which is contained within the cellular structure of the custard condenses after the custard has been removed from the oven. This condensed moisture remains in the cells and when enough of it collects at different places, it causes the gel to break. The cracking or breaking down of the custard ceiling, the honeycomb structure of the filling and the weeping or wheying off previously mentioned is attributed to this cause.

The fourth difficulty encountered in custards relates to the effect of the hydrogen ion concentration on the baking characteristics of the custard or in other words when the pH value of the filling varies from the acid side to the alkaline.

The baker has very little trouble with acid milk or milk that has been neutralized to overcome the natural acidity developed when milk is permitted to stand. This is because developments have taken place in the preservation of milk by drying and condensing. However, in some localities, this type of milk is not known or cannot be secured and troubles are accordingly experienced.

If the milk has developed an appreciable degree of acidity, it will lose its color producing property and even the ability to form the desired structure in the finished product, not alone because of the sugar that has been consumed by the acid forming organisms, but because of the acidity itself and its effect upon the protein phase of the milk.

It has always been assumed that the lack of color on the surface of custard, when the milk is acid, is due to depreciation of the sugar of milk, (lactose), which is consumed by the acid producing bacteria. If a quantity of lactic acid, equal to that developed by the organism, is added to a neutral filling, the same results are obtained even though the full amount of sugar is present in the mixture.

When a custard, having an acid reaction, is baked, the time taken before the filling gels varies from 50% to more than 100% longer than neutral filling. The body shrinks decidedly, the structure itself is quite porous due to the long cooking while the upper surface retains a very light color. When cooked, it has some of the properties of baked cheese cake, in that the top looks exactly like the cottage cheese cakes with which every baker is familiar. The taste would be similar to cheese if the sugar ingredient were not so high.

Those having an alkaline reaction take from 25% to 75% longer to gel than neutral filling. A filling having a heavy alkaline reaction rises to a nice large volume but is very spongy in character. It will have a very dark deep yellow color verging on brown with a suggestion of green and gives the appearance of a very rich confection. The interior structure however is of an almost transparent consistency. When the filling is only slightly alkaline the structure closely resembles the natural neutralized composition but even this is inclined to separate.

To produce the normal creamy custard, care must be taken to insure that the milk is of a neutral consistency. The careful consideration which must be given to each of the above items to secure perfect results is far too exacting but the results caused by the slightest neglect has been the despair of bakers and housewives for years.

Frequently, corn starch is used as an ingredient in the custard formulae, as a thickening agent, to partially overcome some of the attendant difficulties, but the results are far from satisfactory. There is a conspicuous corn starch flavor, a toughening of the custard body to a rubbery consistency, unlike the jelly characteristic of the true confection, and sometimes the corn starch precipitates a distinct layer at the bottom of the custard which shows up in direct contrast with the light creamy upper portion. This spoils the appearance and does not improve its edibility.

From the above generalization of the difficulties encountered, a fair idea of the problems confronting the baker can be realized.

The principal object of the present invention is to provide a compound which the baker can dissolve in hot milk and sugar to form a quick custard filling, ready for the oven, and which will not require the precise baking conditions mentioned in order to secure satisfactory results.

A further object of the invention is to provide ingredients in the compound to correct the cracking, weeping, and honeycomb effects and at the same time neutralize the mixture to prevent acidity and its resulting difficulties.

A further object of the invention is to secure the above results, without the use of cornstarch or other vegetable ingredients which create precipitated heavy layers, and provide a uniform appetizing consistency completely through the structure with the true delicious custard flavor.

A still further object of the invention is to provide a compound which, when mixed and baked as later described will have all the natural characteristics of the true custard as mentioned and none of the defects usually encountered, without requiring any special experience on the part of the baker and free of useless substitutions or adulterations.

With the above important objects in view which will become more apparent as the description proceeds, the invention consists essentially, in the compounding of the ingredients hereinafter, more particularly described, reference being had to the accompanying drawings wherein the process is shown in a diagrammatic form in Fig. 1.

A kettle or boiling caldron is indicated by the numeral 1 and the walls thereof are jacketed at 2 to receive steam through a pair of steam pipes 2. A series of six hoppers 3 are located above the kettle and are connected by pipes 4 to the interior thereof and controlled by valves 5. An agitating or mixing paddle 6 is located in the kettle and operated by an exterior motor 7 while a drain pipe 8 having a valve 9 passes out the bottom of the kettle to enter the top of a cooling tank 10.

This cooling tank is similarly jacketed to receive cooling or refrigerating pipes 11 while a hopper 12 is supported thereabove and provided with a delivery pipe 13 leading therein and controlled by a valve 14. The bottom of the tank is provided with a drain pipe 15 controlled by a valve 16.

This latter drain pipe enters the top of a mixing machine 17 and delivers into a rotatably mounted cylindrical screen drum 18 operated by the exterior motor 19. The casing of the mixer is of an inverted cup shape, encircles the drum and the lower edge is provided with a trough 20 which underlies the cylindrical screen and delivers into a downwardly projecting pipe 21 to a suitable pail 22.

The ingredients of the compound and the operation of the process will now be described.

The various hoppers 3 are each provided with one of the following ingredients and in the amounts specified or in an equivalent ratio in respect to each other, viz, 1½ lbs. of cane sugar
1½ lbs. of milk
3 oz. of salt
Sufficient bicarbonate of soda to neutralize acid formation in the solution.
4 oz. of animal gelatine
4 oz. of glycerine and the hopper 12 will receive 5 lbs. of egg meat (either yoke or whole)

The above amounts refer to one correct formula only of the product. The amounts may be varied considerably if desired.

In preparing the mixture, the valves controlling the sugar and milk are first opened to permit these ingredients to drop into the kettle where the sugar dissolves into the milk which is heated to a boiling point (above 200° F.). The valves controlling the salt and bicarbonate of soda are then opened to permit these ingredients to fall and co-mingle with the heated sweetened milk and in so doing, the bicarbonate of soda changes the solution from an acid (if any) to a solution having a slight alkaline reaction. The valves controlling the gelatine and glycerine are then opened to permit these ingredients to mix with the solution, which it will be noted is still at the boiling temperature. The two will be dissolved therein, the motor 7 will be started and the paddle 6 which will be operating insure a complete co-mingling of the ingredients one with the other. At this phase of the process, the natural acidity of the gelatine will be sufficient to correct the slight alkalinity of the previous solution and neutralize the whole.

The valve 8 is then opened and the solution passes into the cooling tank 10 where the temperature is reduced to blood heat (85° to 95° F.). When this occurs, the valve 14 is opened to release the egg meat from the hopper 12 to complete the ingredients in the compound. The valve 16 is then opened and the partially mixed solution passes into the mixing machine 17 where the revolving drum 18 forces it through the screen under the action of centrifugal force to complete the mix and produce a homogenized compound which passes along the trough 20, out the pipe 21 and into the pail 22 where it congeals when cooled due to the gelatine nature of the composition.

It is desirable, during the last mentioned mixing process, that the temperature remain at blood heat (85° to 95° F.) in order that the solution will not gel before the homogenizing is completed.

The solution or compound is then placed in a refrigerator and frozen and remains there until sold to the bakers, who dissolve it in boiling milk and sugar to create a quick custard filling.

With the use of this type of filling, a considerable variation, both in temperature and time of cooking, may be permitted without seriously endangering the structure of the custard. This is due to the congealing influence of the gelatine which is so intimately associated with the watery element of the combination that the said water becomes viscous and is prevented free movement to collect. Accordingly, the cracking, weeping or wheying off does not result. The spongy texture is also prevented and as the majority of the water cannot pass off in steam, no breaking down of the structure results if the heat remains on a little too long. As no starch is used, the heavy starchy layer is avoided and as the solution is neutralized, a perfect custard color or caramelization results on the upper surface at the same time the filling gels. The glycerine is included in the formula to give a smooth soft texture to the custard structure but while this ingredient is highly desirable, it is not an essential part of the compound. As previously mentioned, the bicarbonate of soda neutralizes the acid characteristic of both the milk and gelatine and insures, not only a delicious appetizing delicatessen, but the taste or edibility of the confection is all that could be desired.

What I claim as my invention is:

1. The process of preparing custard filling which comprises dissolving sugar into milk at boiling temperature, adding an alkaline ingredient to produce a basic mixture, neutralizing the mixture by the addition of gelatine, cooling the solution to approximately blood heat, adding egg meats and subsequently disintegrating the resultant to a homogenized compound.

2. The process of preparing custard filling which consists in alkalizing the milk ingredient thereof, adding animal gelatine at boiling temperature until the milk is neutralized, cooling the solution and adding egg meats at approximately blood heat and disintegrating the resultant to a homogenized compound.

3. The process of preparing custard filling which consists in dissolving sugar into hot milk, adding an alkaline ingredient to produce a basic mixture, neutralizing the mixture by the addition of gelatine, cooling the solution to approximately blood heat, adding egg meats and disintegrating the resultant by a forcible impact disturbance to a homogenized compound.

4. The process of preparing custard filling which consists in dissolving sugar into hot milk, adding bicarbonate of soda to produce a basic mixture, neutralizing the mixture by the addition of gelatine, cooling the solution to approximately blood heat, adding egg meats and disintegrating the resultant to a homogenized compound.

IPHUS HARVEY HALL.